(12) United States Patent
Liu et al.

(10) Patent No.: US 10,770,103 B1
(45) Date of Patent: Sep. 8, 2020

(54) PERPENDICULAR MAGNETIC RECORDING (PMR) WRITER WITH NARROW HIGH MOMENT TRAILING SHIELD

(71) Applicant: Headway Technologies, Inc., Milpitas, CA (US)

(72) Inventors: Ying Liu, San Jose, CA (US); Jiun-Ting Lee, Sunnyvale, CA (US); Min Li, Fremont, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/423,910

(22) Filed: May 28, 2019

(51) Int. Cl.
*G11B 5/60* (2006.01)
*G11B 5/39* (2006.01)

(52) U.S. Cl.
CPC .......... *G11B 5/6082* (2013.01); *G11B 5/3912* (2013.01)

(58) Field of Classification Search
CPC ........ G11B 5/60; G11B 5/6082; G11B 5/3912
USPC .......................................... 360/125.1–125.7
See application file for complete search history.

(56) References Cited

U.S. PATENT DOCUMENTS

| | | |
|---|---|---|
| 6,353,511 B1 | 3/2002 | Shi et al. |
| 7,113,367 B2 | 9/2006 | Yazawa et al. |
| 8,089,723 B2 | 1/2012 | Schabes |
| 8,462,461 B2 | 6/2013 | Braganca et al. |
| 8,498,079 B1 | 7/2013 | Song et al. |
| 9,361,912 B1 | 6/2016 | Liu et al. |
| 9,466,319 B1 | 10/2016 | Tang et al. |
| 9,508,364 B1 * | 11/2016 | Tang ....................... G11B 5/112 |
| 9,697,855 B1 | 7/2017 | Liu et al. |
| 9,741,373 B1 | 8/2017 | Shinohara et al. |
| 9,754,612 B2 | 9/2017 | Wei et al. |
| 9,990,942 B1 | 6/2018 | Liu et al. |
| 10,032,469 B2 | 7/2018 | Lim et al. |
| 10,121,497 B1 | 11/2018 | Takahashi et al. |
| 2012/0050921 A1 | 3/2012 | Marshall |

OTHER PUBLICATIONS

"Effect of 3d, 4d, and 5d transition metal doping on damping in permalloy thin films," by J. O. Rantschler et al., Journal of Applied Physics 101, 033911, Feb. 14, 2007, pp. 1-5.

(Continued)

*Primary Examiner* — Allen T Cao
(74) *Attorney, Agent, or Firm* — Saile Ackerman LLC; Stephen B. Ackerman

(57) ABSTRACT

A PMR writer is disclosed wherein the trailing shield (TS) structure has a high moment trailing shield (HMTS) with a saturation (Bs) from 19 kiloGauss (kG) to 24 kG and a width (w) from 10 nm to 500 nm and is separated from the main pole (MP) trailing side at an air bearing surface (ABS) by a first write gap (WG) portion of thickness t1. A second WG portion of thickness t2 where t2>t1 adjoins the sides of the first WG portion, and has an outer side at a cross-track distance ½ w1 from a center plane that bisects the MP trailing side where w1>w. A first TS layer is formed on the HMTS and on the second WG portion, and has an outer side coplanar with the second WG portion outer side. Accordingly, there is improvement in tracks per inch capability and adjacent track interference.

12 Claims, 8 Drawing Sheets

(56) References Cited

OTHER PUBLICATIONS

"Micromagnetic Analysis of Adjacent Track Erasure of Wrapped-Around Shielded PMR Writers," by Suping Song et al., IEEE Transactions on Magnetics, vol. 45, No. 10, Oct. 2009, pp. 3730-3732.

"Characterization of Adjacent Track Erasure in Perpendicular Recording by a Stationary Footprint Technique," by Yuhui Tang et al., IEEE Transactions on Magnetics, vol. 49, No. 2, Feb. 2013, pp. 744-750.

"Magnetic Damping in Ferromagnetic Thin Films," by Mikihiko Oogane et al., Japanese Journal of Applied Physics, vol. 45, No. 5A, May 9, 2006, pp. 3889-3891.

* cited by examiner

US 10,770,103 B1

PERPENDICULAR MAGNETIC RECORDING (PMR) WRITER WITH NARROW HIGH MOMENT TRAILING SHIELD

RELATED PATENT APPLICATIONS

This application is related to the following: U.S. Pat. No. 9,466,319; and U.S. Pat. No. 9,990,942; assigned to a common assignee and herein incorporated by reference in their entirety.

TECHNICAL FIELD

The present disclosure relates to a trailing shield (TS) structure in a PMR writer wherein a high moment trailing shield (HMTS) having a first width (w) is formed on a first write gap (WG) portion with a first thickness (t1) above a main pole (MP) trailing side, and a lower moment TS having a second width (w1) where w1>w is formed on the HMTS and on a second WG portion that has a second WG thickness (t2) where t2>t1 in order to provide improved adjacent track interference (ATI) and tracks per inch (TPI) capability.

BACKGROUND

With growing demands for cloud storage and cloud-based network computing applications, high and ultrahigh data rate recording becomes important for near-line and high-end disk drive devices. It is essential to design a PMR writer that can achieve optimum high data rate performance in both area density capability (ADC) and ATI also referred to as adjacent track erasure (ATE).

A PMR write head typically has a MP layer having a MP tip with a small surface area at an air bearing surface (ABS), and coils that conduct a current and generate a magnetic flux in the MP layer such that the magnetic flux exits through the MP tip and enters a magnetic medium (disk) adjacent to the ABS. Magnetic flux is used to write a selected number of bits in the magnetic medium and typically returns to the MP through a trailing loop comprised of a trailing shield structure with a front side at the ABS and a PP3 trailing shield portion that extends over the coils and connects to a top surface of the MP layer above a back gap magnetic connection.

For both conventional (CMR) and shingle magnetic recording (SMR), continuous improvement in storage area density or ADC is required for a PMR writer in order to deliver or pack higher bits per inch (BPI) and higher TPI. An all wrap around (AWA) shield structure that surrounds the MP tip in a PMR write head is desirable in that the trailing shield is responsible for improving down track field gradient while side shields and a leading shield improve the cross track field gradient and TPI as well as ATI performance.

Current PMR writers tend to have the trailing shield (TS) layer in one piece with the same material from center to edge of the trailing shield structure. As depicted in FIG. 1, PMR head performance sits on a line 2 where better TS efficiency (ADC) is typically traded off for better ATI by selecting magnetic materials with different Bs also known as magnetization saturation (Ms). With a high Ms material, the magnetic path driving main pole and trailing shield gains efficiency from low reluctance. However, high Ms materials also lead to more field leakage and worse ATI. Thus, an improved trailing shield design is needed to escape the tradeoff line and approach a point A where both high trailing shield efficiency in terms of improved ADC, and better ATI are realized.

SUMMARY

One objective of the present disclosure is to provide a trailing shield structure for a PMR writer that enables a means of enhancing ADC capability and ATI.

Another objective of the present disclosure is to provide a process for fabricating an AWA shield design with a trailing shield structure according the first objective that uses existing tools and methods.

According to a first embodiment, these objectives are achieved with an AWA shield design surrounding a MP tip at the ABS. A center plane bisects the MP trailing side and MP leading side, and is orthogonal to the ABS. The AWA shield design includes a side shield (SS) on each side of the center plane, and where each SS is separated from a MP side by a side gap. There is a leading shield adjoining a bottom surface of each SS, and separated from the MP leading side by a leading gap.

A key feature of the AWA shield design is the trailing shield (TS) configuration comprised of a HMTS that is made of a magnetic material with a saturation (Bs) value of 19-24 kiloGauss (kG), and has a cross-track width w from 10 nm to 500 nm above the MP trailing side. A first WG portion having a thickness t1 is formed between the MP trailing side and HMTS bottom surface. The first WG portion is formed on a first plane that includes the MP trailing side, side gap top surfaces, and inner sections of SS top surface at the ABS. A second WG portion is formed on the side gaps and inner SS sections on each side of the center plane, and extends from a side of the first WG portion to a cross-track distance ½ w1 from the center plane where w1 is substantially greater than w. The second WG portion has thickness t2 where t2>t1. The TS configuration also comprises a first TS layer made of a material with a Bs less than that of the HMTS, and typically in the range of 4-22 kG. The first TS layer has a width w1 bisected by the center plane, and has a non-planar top surface wherein a center portion formed on the HMTS has a top surface that is a greater down-track distance from the first plane than a top surface of outer portions formed on the second WG portion. There is also a second TS layer that is made of a 16-24 kG material, and having a full width between far sides of the AWA shield structure. The second TS layer adjoins a top surface of the first TS layer, the sides of the first TS layer and second WG portions, and contacts a top surface of an outer section of SS top surface on each side of the center plane. The TS configuration provides an improvement in TPI and ATI while maintaining BPI for an overall enhancement in ADC.

According to a preferred fabrication sequence, the MP with a tapered trailing side in the MP tip is formed on the leading gap and inner sides of the side gaps. At this point, from a perspective at the eventual ABS plane, the side gap top surface and the SS top surface are at the first plane. The MP tapered trailing side connects with the MP top surface at a first height (h1) from the eventual ABS plane. A first dielectric layer with a tapered front side that is coplanar with the MP tapered trailing side is formed on the MP top surface. Then, a first WG layer and HMTS layer are sequentially deposited on the MP tapered trailing side, first dielectric layer, side gaps and SS top surface. A first photoresist mask is formed on the HMTS layer and an ion beam etch (IBE) or reactive ion etch (RIE) is used to remove exposed portions of the HMTS layer to form sides thereon, and yield a HMTS and first a WG portion below the HMTS each having width w that is bisected by the center plane.

Thereafter, a second WG layer is deposited on the exposed top surface of the first WG layer thereby forming the second WG portion that extends from a side of the HMTS to a far side of the shield structure on each side of the center plane. Next, the first TS layer is deposited on the HMTS top surface and on the second WG portion. A second photoresist mask having width w1 is formed on the first TS layer. A second IBE or RIE is performed to remove exposed portions of the first TS layer, second WG portion, and stopping on the SS top surface. Typically, the second etch removes a portion of the SS top surface starting at a distance of ½ w1 from the center plane to a far side of the shield structure on each side of the center plane. Thereafter, the second TS layer is deposited on exposed portions of SS top surface, on the first TS top surface, and on the sides of the first TS layer and second WG portion. Subsequently, a conventional process flow is followed to form a backside on the HMTS, first TS layer, and second TS layer at height h2 from the ABS where h2>h1. The first and second TS layers may be referred to as the write shield (WS). Then, the PP3 trailing shield and other layers above the MP in the PMR writer structure are formed to complete the PMR writer structure according to a well known sequence of process steps well known in the art.

DETAILED DESCRIPTION

The present disclosure relates to a trailing shield (TS) structure comprised of a narrow HMTS on a first WG portion above a MP trailing side, a first TS layer on the HMTS and on a second WG portion that adjoins a side of the first WG portion on each side of a center plane, and a second TS layer on the first TS layer and contacting a SS top surface adjacent to outer sides of the second WG portion. Accordingly, improved ADC and ATI are achieved for the PMR writer. In the exemplary embodiment, the MP has tapered leading side and tapered trailing side, and a trapezoidal shape from an ABS view. However, the present disclosure encompasses other shapes for the MP proximate to the ABS, and where one or both of the MP leading and trailing sides are orthogonal to the ABS and not tapered. The y-axis is a cross-track direction, the z-axis is a down-track direction, and the x-axis is in a direction orthogonal to the ABS and towards a back end of the PMR writer. The trailing shield design described herein is compatible with various coil schemes, and is not limited to a specific write head structure or to a particular combined read head/write head configuration.

Figure 1:
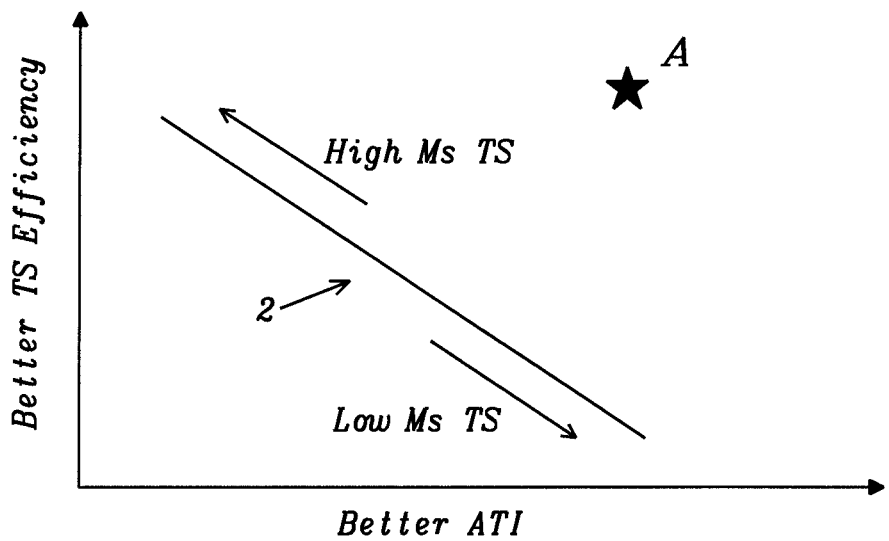
FIG. 1 is a plot showing the trade off between trailing shield (TS) efficiency and ATI when the magnetic saturation (Ms) value is varied in the trailing shield.
Figure 2:
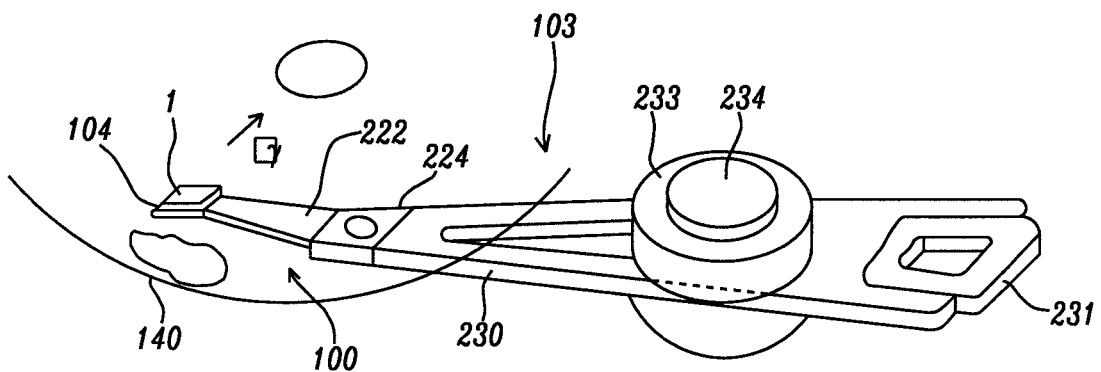
FIG. 2 is a perspective view of a head arm assembly of the present disclosure.

Referring to FIG. 2, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 3:
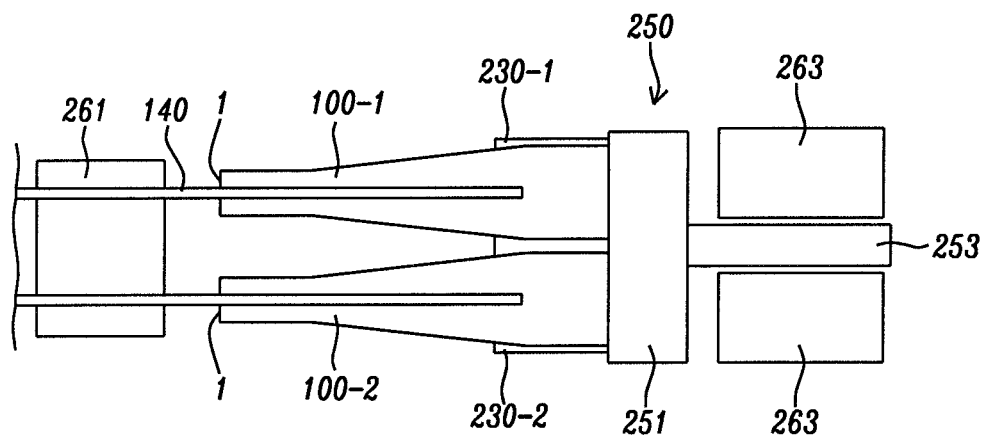
FIG. 3 is side view of a head stack assembly of the present disclosure.

Next, a side view of a head stack assembly (FIG. 3) and a plan view of a magnetic recording apparatus (FIG. 4) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (253 in FIG. 3) of the voice coil motor is mounted at the opposite side of each arm in carriage 251. The voice coil motor has a permanent magnet 263 arranged at an opposite position across the coil 253.

Figure 4:
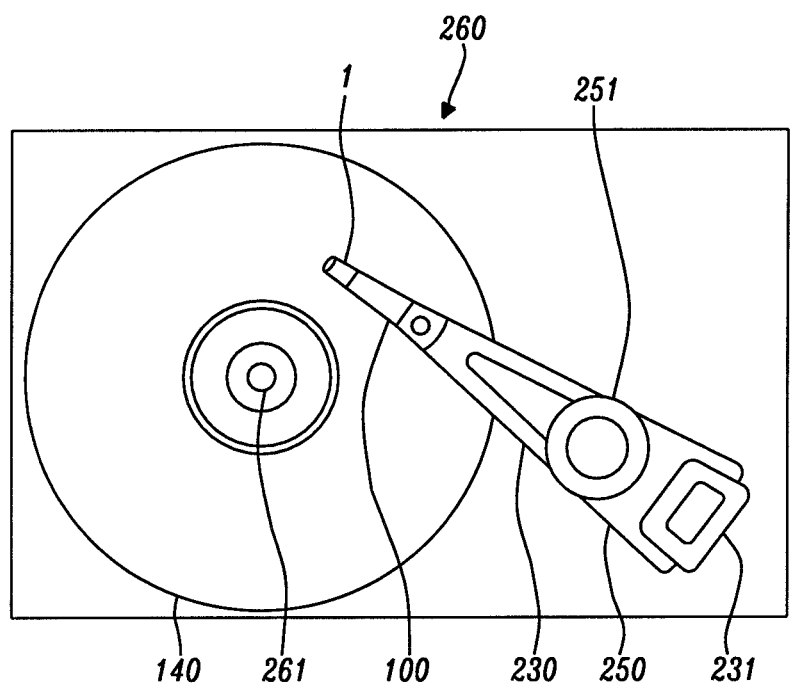
FIG. 4 is a plan view of a magnetic recording apparatus of the present disclosure.

With reference to FIG. 4, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
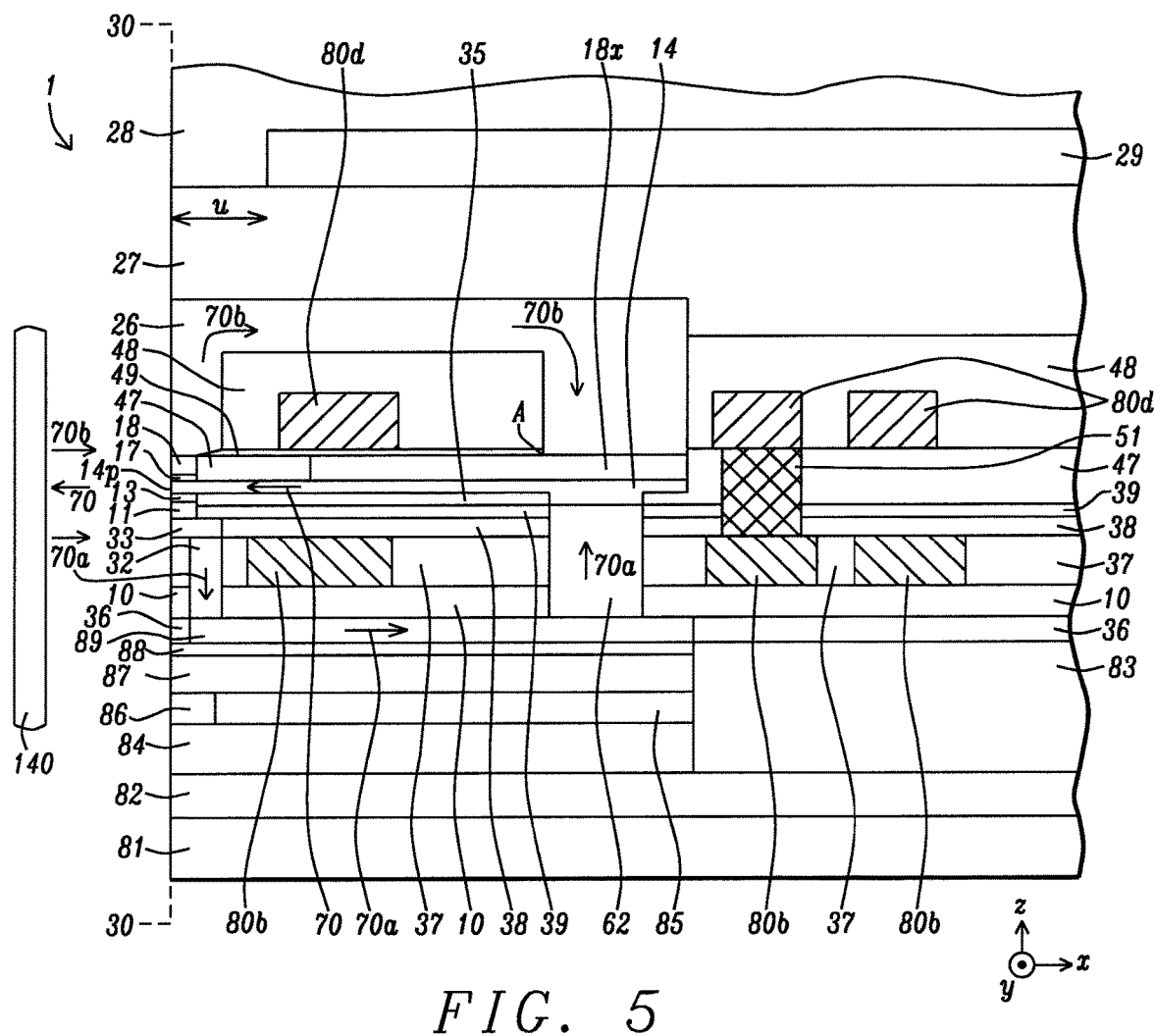
FIG. 5 is a down-track cross-sectional view of a combined read-write head with leading and trailing loop pathways for magnetic flux return to the main pole according to an embodiment of the present disclosure.

Referring to FIG. 5, magnetic recording head 1 comprises a combined read-write head. The down-track cross-sectional view is taken along a center plane (44-44 in FIG. 7) formed orthogonal to the ABS 30-30, and that bisects MP 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 5 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in MP 14 is generated with flowing a current through bucking coil 80b and driving coil 80d that are below and above the MP, respectively, and are connected by interconnect 51. Magnetic flux 70 exits the MP at pole tip 14p at the ABS 30-30 and is used to write a plurality of bits on magnetic media 140. Magnetic flux 70b returns to the MP through a trailing loop comprised of HMTS 17, trailing shield 18, PP3 trailing shield 26, and top yoke 18x. There is also a leading return loop for magnetic flux 70a that includes leading shield 11, leading shield connector (LSC) 33, S2 connector (S2C) 32, return path 89, and back gap connection (BGC) 62. The magnetic core may also comprise a bottom yoke 35 below the main pole layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 6:
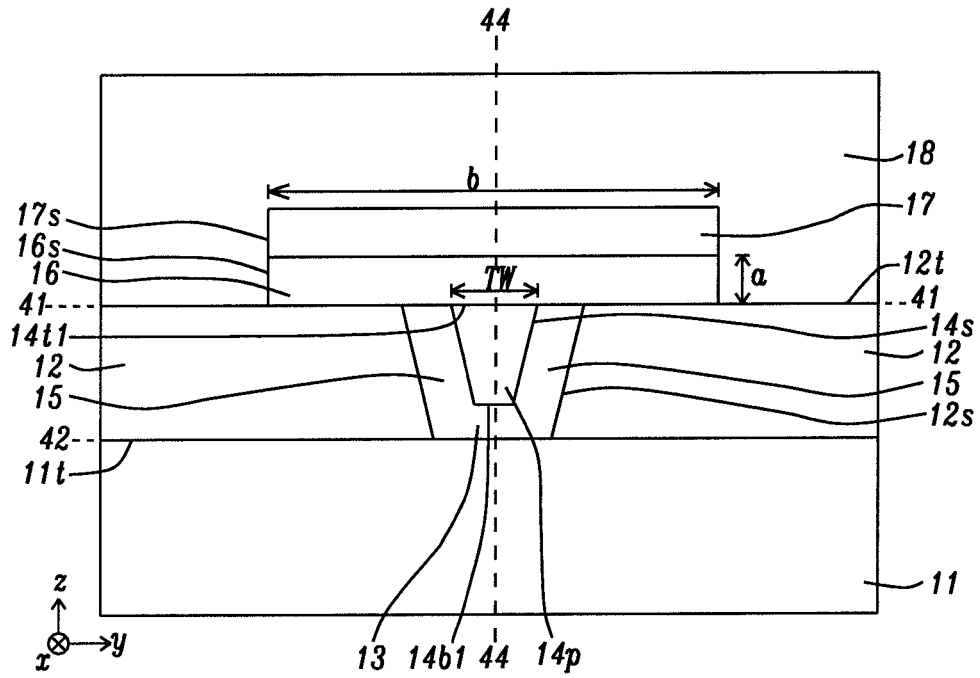
FIG. 6 is an ABS view that shows a prior art shield structure wherein a high moment trailing shield (HMTS) is on a WG that has a uniform thickness, and a write shield (WS) adjoins the HMTS top surface and sides of the WG and HMTS.

Referring to FIG. 6, an ABS view of an AWA shield structure known to the inventors as a process of record (POR) design is depicted. MP tip 14 is shown with a trailing side 14t1 having track width TW, and a leading side 14b1, which contacts leading gap 13. The trailing side and leading side are connected with two sides 14s that each adjoin a side gap 15. Center plane 44-44 bisects the MP tip in a down-track direction, and is orthogonal to the ABS. Side shields 12 contact a top surface 11t of leading shield 11, and each side shield has a top surface 12t at a plane 41-41 that is orthogonal to the ABS and to the center plane, and includes MP trailing side 14t1 at the ABS. Write gap (WG) 16 with a uniform thickness a, and high moment trailing shield (HMTS) 17 are sequentially formed on the MP trailing side and each has a cross-track width b that is substantially greater than the TW. WS 18 has a full width (between far sides of the AWA shield structure), is formed on the HMTS top surface and on SS top surface 12t, and contacts WG side 16s and HMTS side 17s. A PP3 trailing shield (not shown) is recessed behind the ABS and adjoins a top surface of the WS.

In related U.S. Pat. No. 9,990,942, we disclosed an outer TS made of an 8-16 kG material formed on each side of a HMTS and an overlying 16-24 kG TS that each have a width substantially greater than the TW to improve ADC and minimize ATI. Now we have discovered that by narrowing the HMTS to a width substantially less than that of the WG width, further improvement in ADC and ATI may be realized.

Figure 7:
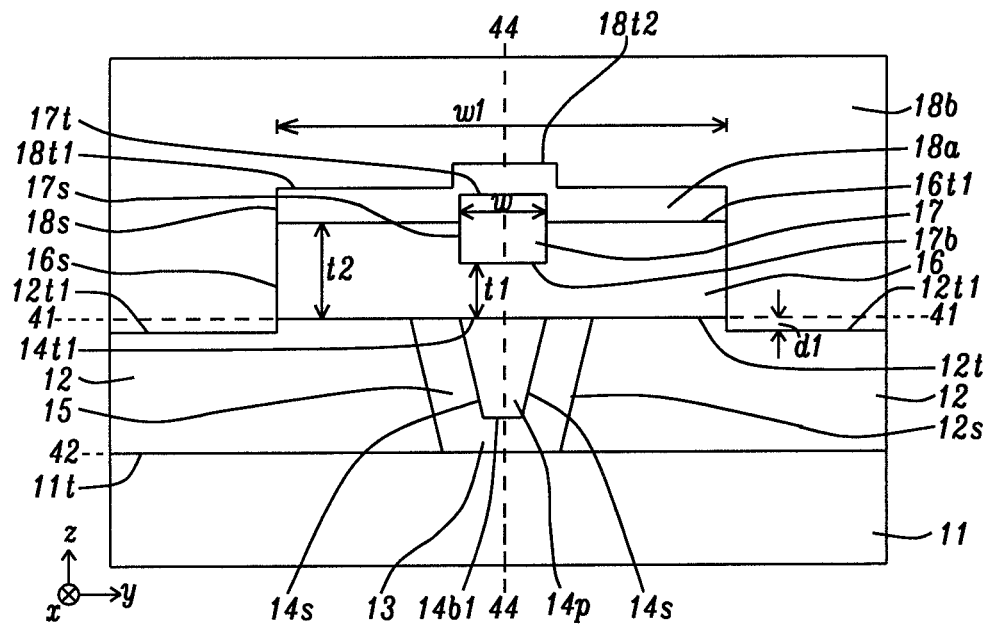
FIG. 7 is an ABS view of a shield structure according to an embodiment of the present disclosure where a narrow width HMTS is formed only on a center WG portion that is thinner than outer WG portions on which the WS is formed.
Figure 8A:
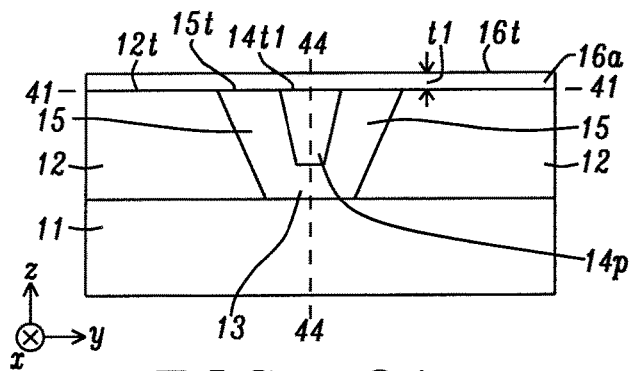
FIG. 8A is an ABS view and FIG. 8B is a down-track cross-sectional view showing a first step in fabricating the HMTS and WS of the present disclosure where a first WG layer is deposited on the MP trailing side, side gaps, and side shields.
Figure 8B:
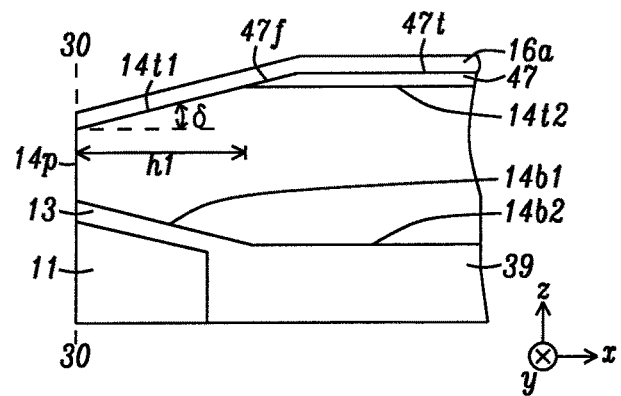

Referring to FIG. 7, an ABS view of an AWA shield design having a trailing shield structure formed according to a first embodiment of the present disclosure is depicted. The leading shield 11, leading gap 13, and side gaps 15 are retained from the POR design in FIG. 6. An outer section of SS top surface 12t1 on each side of center plane 44-44 may be formed below plane 41-41 while an inner section proximate to inner SS side 12s maintains a top surface 12t at the POR position described previously. In alternative embodiments, SS top surface 12t1 is at plane 41-41. A key feature is that HMTS 17 now has a width w in the range of 10 nm to 500 nm that is substantially less than the width w1 of WG 16, and has bottom surface 17b formed on a first (inner) portion of WG having thickness t1 above MP trailing side 14t1 where t1<thickness t2 of a second (outer) portion of the WG. In the exemplary embodiment, w is shown essentially equal to the track width (TW in FIG. 6) of the MP trailing side. However, in other embodiments, w may be less than or greater than TW.

The second WG portion has an outer side 16s, top surface 16t1, and is formed on side gaps 15 and SS top surface 12t on each side of the center plane. Thus, each second WG portion adjoins a side of the first WG portion at a cross-track distance ½ w from the center plane. Each outer side 16s is coplanar with a first TS side 18s and both are a cross-track distance ½ w1 from the center plane where w1 is the width of the first TS layer 18a.

The first TS layer 18a is formed on the second WG portion top surface 16t1 and on HMTS 17. The first TS layer has a non-planar top surface wherein an inner section 18t1 above the HMTS is a greater distance from plane 41-41 than outer sections 18t2 above the second WG portion. In another embodiment described in a later section where the HMTS sidewall 17s is non-vertical, the transition from top surface 18t1 to 18t2 may be gradual rather than a step function shown in FIG. 7. Second TS layer 18b is formed on the first TS layer and on SS top surfaces 12t1, and contacts the first TS side 18s and outer side 16s of the second WG portion.

As illustrated in the process sequence described later, HMTS width w is defined in a separate step from the first TS width and WG width w1 unlike the prior art. Accordingly, this departure from the conventional series of patterning steps allows w to be substantially smaller than w1. As a result, there is a benefit in improved TPI and ATI performance compared with prior art shield designs. These advantages apply to PMR writers and to writers that employ a microwave assisted magnetic recording (MAMR) effect. The latter comprises a spin torque oscillator (STO) device in the first WG portion between the MP trailing side and HTMS where the STO device generates a radio frequency (RF) field on a bit magnetization in a magnetic medium that lowers the coercivity therein and enables a reduced write field to switch the bit magnetization.

Returning to FIG. 7, each of the HMTS 17, first TS layer 18a, and second TS layer 18b is typically comprised of FeCoNi, FeCo, NiFe, or FeCoN. In preferred embodiments, the HMTS is a 19-24 kG material, the first TS layer has a Bs from 4-22 kG and less than that of the HMTS, and the second TS layer is a 16-24 kG material. HMTS thickness between top and bottom surfaces 17t and 17b, respectively, is from 5 nm to 200 nm. First WG portion thickness t1 is generally from 5 nm to 50 nm while second WG portion thickness t2 is typically 5 nm to 100 nm and greater than t1.

According to another embodiment, one or more of the HMTS, first TS layer, and second TS layer are made of a high damping (HD) magnetic material with a damping constant ≥0.04 as disclosed in related U.S. Pat. No. 9,466, 319 where the HD magnetic material is one of FeNiM, FeNM, FeCoM, and FeCoNiM and wherein M is a 3d, 4d, or 5d transition metal.

The present disclosure also encompasses a process sequence for forming a PMR writer having an AWA shield design with a trailing shield structure including a narrow HMTS disclosed herein and depicted in FIGS. 8A-15. The process steps begin at a point shown in FIG. 8A where a MP tapered trailing side 14t1 has a front (trailing) edge at plane 41-41 that also comprises top surface 15t of side gaps 15, and top surface 12t of side shields (SS) 12. A first WG layer 16a with thickness t1 is deposited on SS 12, the side gaps, and on the MP trailing side. FIG. 8B is a down-track cross-sectional view at center plane 44-44 in FIG. 8A and illustrates the MP tapered trailing side is formed with a taper angle δ and extends a first height h1 from the eventual ABS hereinafter referred to as plane 30-30. The first height is where the MP tapered trailing side connects with MP top surface 14t2 that is orthogonal to plane 30-30. The first dielectric layer 47 is formed on the MP top surface and has a front side 47f that is coplanar with the MP tapered trailing side. First dielectric layer top surface 47t, and MP bottom surface 14b2 are also orthogonal to plane 30-30. MP tip 14p may also have a tapered leading surface 14b1 that connects with the MP bottom surface 14b2.

Figure 9A:
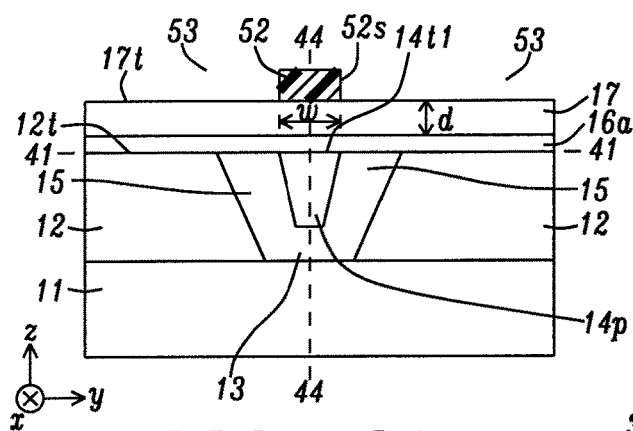
FIG. 9A is an ABS view and FIG. 9B is a down-track cross-sectional view showing the partially formed shield structures in FIG. 8A and FIG. 8B, respectively, after a HMTS layer is deposited on the first WG layer, and a photoresist mask having a width w is formed on the HMTS layer.
Figure 9B:
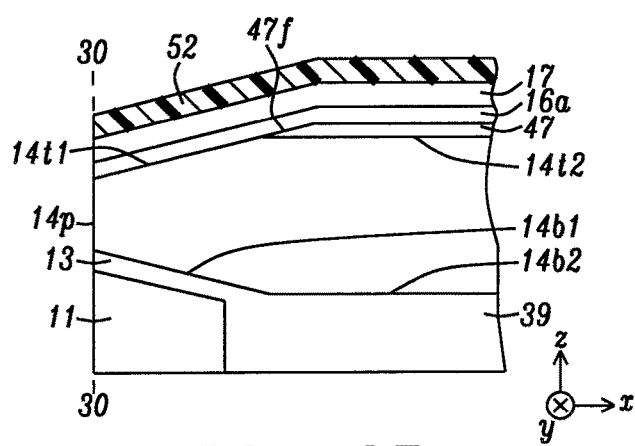

In FIG. 9A, HMTS layer 17 with thickness d from 5 nm to 200 nm is deposited on first WG layer 16a, and is preferably comprised of FeCo, FeCoNi, FeCoN or NiFe having a Bs from 19 kG to 24 kG. Thickness d may be less than used for a HMTS in the prior art because a thinner HMTS can help reduce HMTS related erasure, and a thinner HMTS is easier to process when narrow HMTS width is required. Then a photoresist layer is coated on the HMTS layer, and is patternwise exposed and developed using a conventional photolithography process to form photoresist mask 52 having sides 52s and width w that is bisected by center plane 44-44. Openings 53 on each side of the photoresist mask expose a portion of HMTS top surface 17t. FIG. 9B depicts a down-track cross-sectional view at the center plane in FIG. 9A and shows that the photoresist mask extends above first dielectric layer 47 and towards a back end of the PMR writer.

Figure 10A:
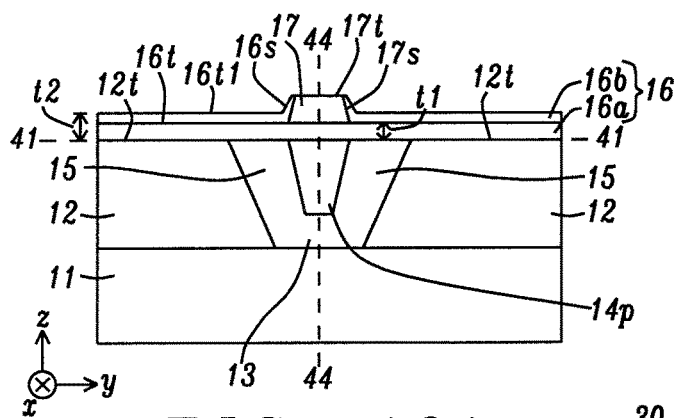
FIG. 10A is an ABS view and FIG. 10B is a down-track cross-sectional view showing the partially formed shield structures in FIG. 9A and FIG. 9B, respectively, after the HMTS layer is etched to form a HMTS of width w, and a second WG layer is deposited on the HMTS sides and on exposed portions of the first WG layer.
Figure 10B:
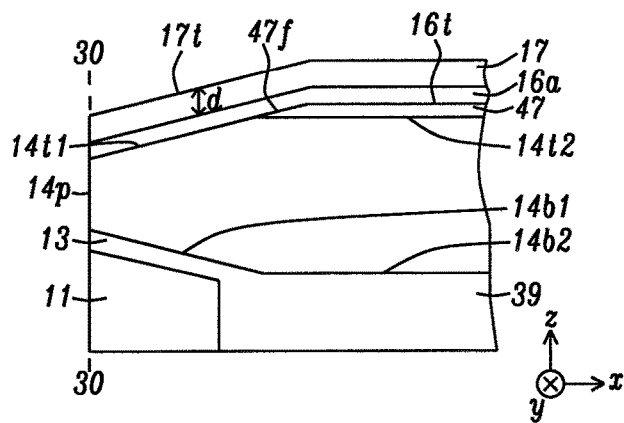

Referring to FIG. 10A, a first ion beam etch (IBE) or reactive ion etch (RIE) is performed to remove exposed portions of HMTS layer 17 and stopping on first WG layer 16a thereby forming HMTS 17 having width w. In the exemplary embodiment, the HMTS has non-vertical sidewalls. However, in other embodiments, the HMTS sidewall 17s may be proximate to 90 degrees depending on the etch conditions and HMTS thickness d. A second WG layer 16b is deposited on first WG layer top surface 16t and on the HMTS sidewall, and may be comprised of the same dielectric material as in the first WG layer. Second WG layer top surface 16t1 is formed substantially parallel to first WG layer top surface 16t while the portion of the second WG layer above the non-vertical HMTS sidewall has sidewall 16s that is also non-vertical. The photoresist mask is removed using a conventional method. As shown in the down-track cross-sectional view at plane 44-44 in FIG. 10B, the HMTS has a top surface 17t that is preferably conformal to (parallel to) first WG layer top surface 16t. Note that WG layers 16a, 16b between sidewall 16s and a far side of the shield structure may be considered an outer second portion of WG 16 having a thickness t2 while an inner first portion of the WG comprises WG layer 16a having thickness t1 below the HMTS where t2>t1.

Figure 11A:
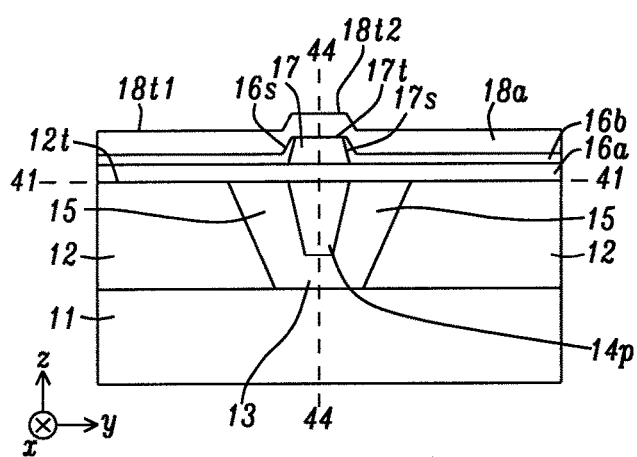
FIG. 11A is an ABS view and FIG. 11B is a down-track cross-sectional view showing the partially formed shield structures in FIG. 10A and FIG. 10B, respectively, after a first TS layer is deposited on the HMTS top surface and on the second WG layer.
Figure 11B:
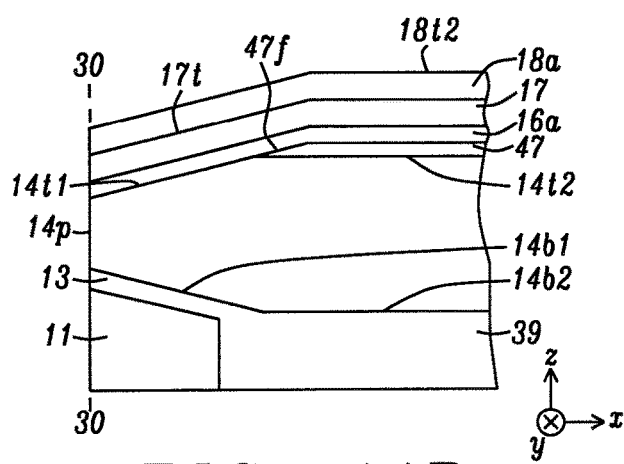

Referring to FIG. 11A, a first TS layer 18a is conformally deposited on HMTS top surface 17t and on second WG top surface 16t1. The first TS layer is preferably made of FeCo, FeCoNi, FeCoN, or NiFe with a Bs from 4 kG to 22 kG, and preferably less than the Bs of HMTS 17. There is a first portion of first TS top surface 18t2 formed above HMTS 17 and bisected by center plane 44-44 that is a greater distance from plane 41-41 than second portions of first TS top surface 18t1 formed above second WG layer 16b. FIG. 11B shows a down-track cross-sectional view of the partially formed PMR writer in FIG. 11A.

Figure 12A:
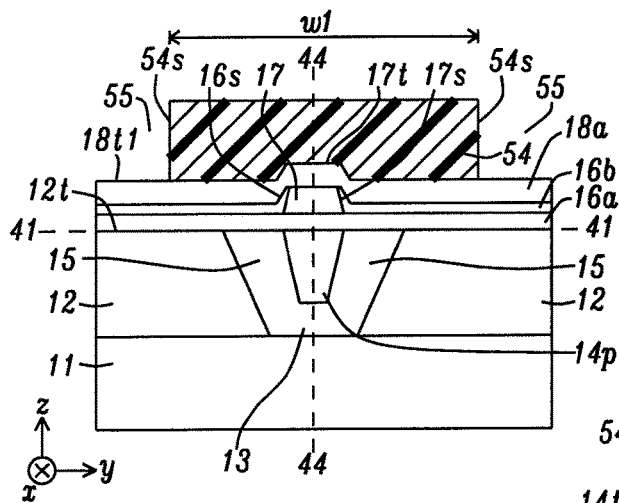
FIG. 12A is an ABS view and FIG. 12B is a down-track cross-sectional view showing the partially formed shield structures in FIG. 11A and FIG. 11B, respectively, after a second photoresist mask having a width w1 is formed on the first TS layer.
Figure 12B:
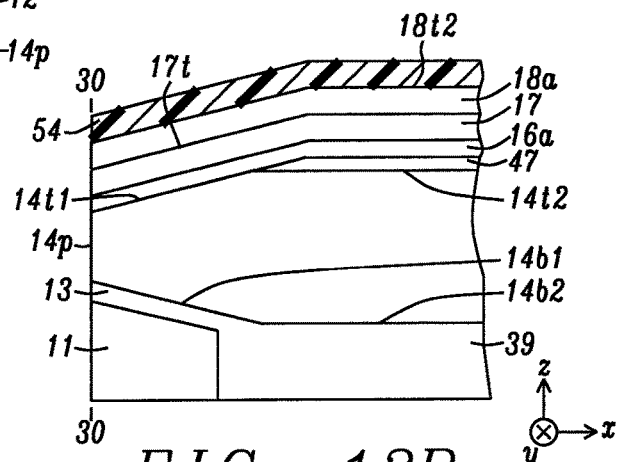

In FIG. 12A, a second photoresist is coated on the first TS layer 18a and then patternwise exposed and developed by employing a typical photolithography process to form a second photoresist mask 54 that is bisected by center plane 44-44 and has width w1 where w1 is substantially greater than w. The second photoresist mask has sides 54s and adjoins openings 55 that expose outer portions of first TS top surface 18*t*1 above SS top surface 12*t*. FIG. 12B depicts a down-track cross-sectional view at the center plane.

Figure 13A:
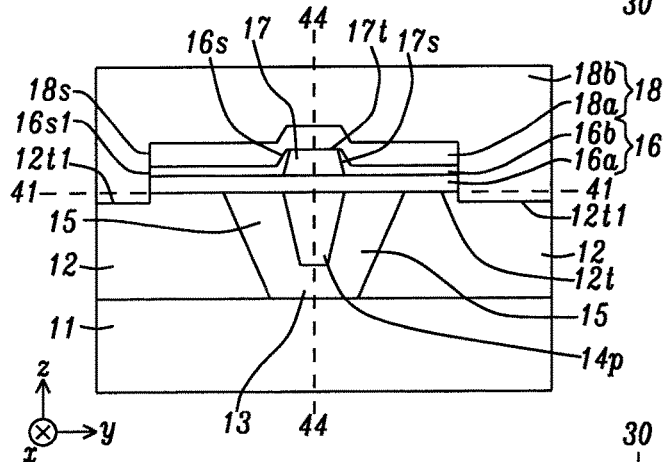
FIG. 13A is an ABS view and FIG. 13B is a down-track cross-sectional view showing the partially formed shield structures in FIG. 12A and FIG. 12B, respectively, after the second photoresist mask pattern is etch transferred through the first TS and WG layers, and a second TS layer is deposited.
Figure 13B:
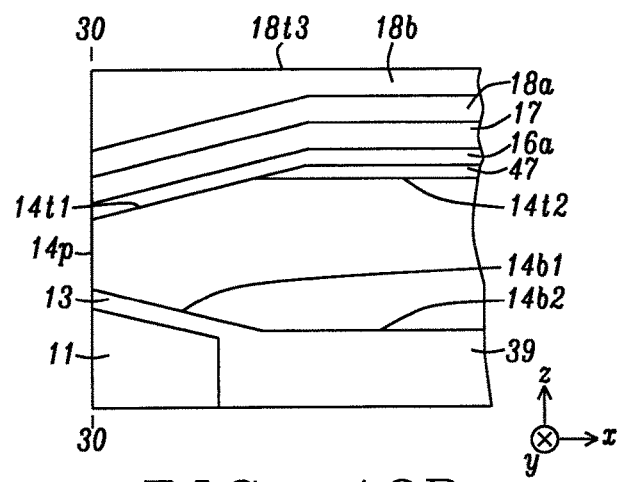

FIG. 13A shows the partially formed PMR writer after a second IBE or RIE is employed to remove portions of first TS layer 18*a*, first WG layer 16*a*, and second WG layer 16*b* that are not protected by the second photoresist mask. In the exemplary embodiment, the etch also removes an exposed top portion of SS 12 to generate a SS top surface 12*t*1 below plane 41-41 at the ABS. However, the etch may be stopped at plane 41-41 in other embodiments. In addition, an outer side 16*s*1 on the first and second WG layers 16*a*, 16*b*, respectively, is formed coplanar with an outer side 18*s* of first TS layer side 18*a* at a distance ½ w1 on each side of the center plane 44-44. After the second photoresist mask is removed, second TS layer 18*b* is deposited on SS top surface 12*t*1 and on the first TS layer. The down-track cross-sectional view in FIG. 13B shows the second TS layer top surface 18*t*3 is preferably planar, and may be formed using a chemical mechanical polish (CMP) process, for example. The second TS layer is preferably one of FeCo, FeCoNi, FeCoN, and NiFe and has a Bs from 16 kG to 24 kG.

Figure 14:
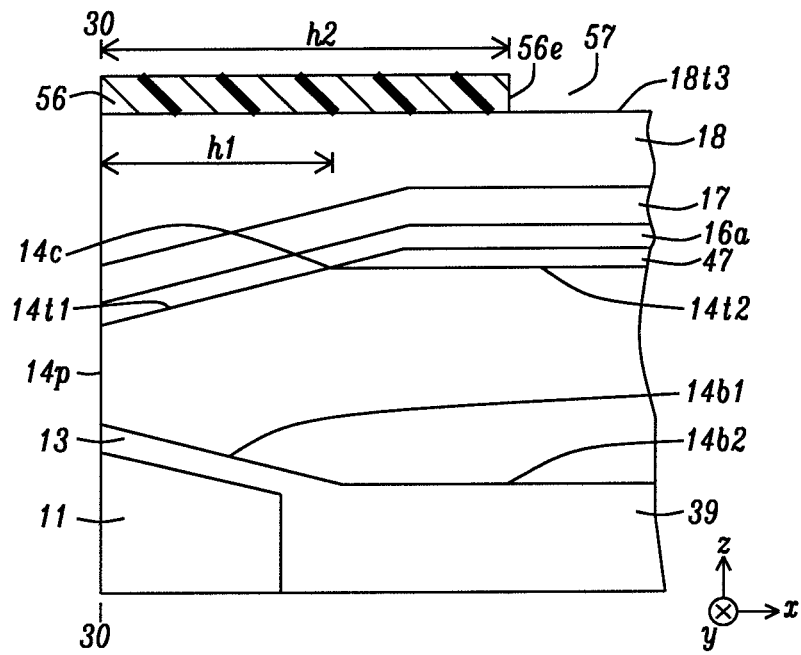
FIGS. 14-15 are down-track cross-sectional views showing a sequence of steps of forming a backside on the HMTS, and on the first and second TS layers according to an embodiment of the present disclosure.

Referring to FIG. 14, note that first TS layer 18*a* and second TS layer 18*b* are now shown as a single TS layer or WS 18. A third photoresist is coated on the WS, and is then patternwise exposed and developed with a conventional process to form a third photoresist mask 56 having a backside 56*e* at height h2 from plane 30-30 where h2>h1, and h1 is the height of MP corner 14*c* from plane 30-30, and where MP trailing side 14*t*1 intersects MP top surface 14*t*2. Opening 57 is behind the third photoresist mask backside 56*e* and exposes a portion of WS top surface 18*t*3.

Figure 15:
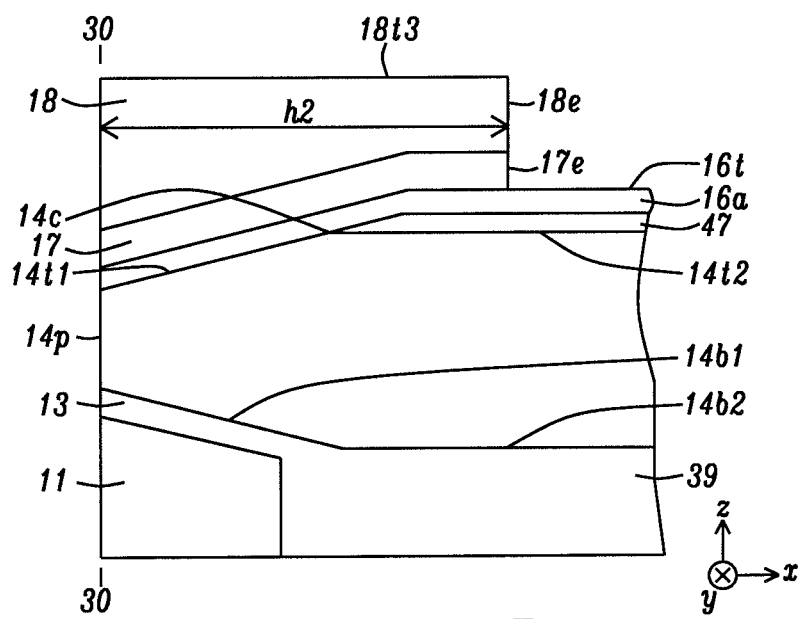

In FIG. 15, the partially formed PMR writer is shown after a third IBE or RIE is used to remove portions of WS 18 and HMTS 17 that are not protected by the third photoresist mask thereby forming WS backside 18*e* and HMTS backside 17*e* at height h2. Thus, opening 57 is extended downward and stops on first WG layer 16*a*. Thereafter, another dielectric layer (not shown) may be deposited to fill the opening before the third photoresist mask is removed. The remainder of the fabrication sequence comprises conventional steps that are well known in the art and are not described herein. A lapping process is employed to form the ABS at plane 30-30 to complete the PMR writer structure.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
    (a) a main pole with a leading side and a trailing side at an air bearing surface (ABS), and two sides that connect the leading side and trailing side and are formed equidistant from a center plane that is orthogonal to the ABS;
    (b) a side shield on each side of the center plane that is separated from one of the MP sides by a side gap, and wherein an inner section of a top surface of each side shield is at a first plane that includes the MP trailing side and a side gap top surface at the ABS;
    (c) a trailing shield structure, comprising;
        (1) a high moment trailing shield (HMTS) having a saturation (Bs) value from 19 kiloGauss (kG) to 24 kG and a first cross-track width (w), and wherein the HMTS has a bottom surface separated from the MP trailing side by a first portion of a write gap (WG) having a first thickness (t1) and width w;
        (2) a first trailing shield (TS) layer having a width w1 where w1 is substantially greater than w, and wherein the first TS layer is formed on a top surface of the HMTS and on a top surface of a second portion of WG where a side of the second WG portion adjoins a side of the first WG portion on each side of the center plane, the second WG portion has a thickness t2 where t2>t1; and
        (3) a second TS layer formed on a top surface of the first TS layer, and that contacts an outer section of each side shield top surface at a cross-track distance from ½ w1 from the center plane to a far side of the trailing shield structure, and
    (d) the second WG portion that is formed on a top surface of each inner SS section, and has an outer side that is coplanar with a first TS layer side at the cross-track distance of ½ w1 from the center plane.

2. The PMR writer of claim 1 wherein the first TS layer has a Bs value from 4 kG to 22 kG.

3. The PMR writer of claim 1 wherein the second TS layer has a Bs value from 16 kG to 24 kG.

4. The PMR writer of claim 1 wherein the first width is from 10 nm to 500 nm.

5. The PMR writer of claim 1 wherein the MP trailing side is tapered and connects with a MP top surface at a first height (h1) from the ABS.

6. The PMR writer of claim 5 wherein the trailing shield structure has a backside at a second height (h2) from the ABS where h2>h1.

7. The PMR writer of claim 1 wherein t1 is from 5 nm to 50 nm, and t2 is from 5 nm to 100 nm.

8. The PMR writer of claim 1 wherein the HMTS has a thickness between 5 nm and 200 nm.

9. The PMR writer of claim 1 wherein the top surface of the first TS layer is non-planar such that a first section thereof above the HMTS is a greater distance from the first plane than a second section above the second portion of WG on each side of the center plane.

10. The PMR writer of claim 1 wherein one or more of the HMTS, first TS layer, and second TS layer is comprised of a high damping (HD) material with a damping parameter ≥0.04.

11. A head gimbal assembly (HGA), comprising:
    (a) the PMR writer of claim 1; and
    (b) a suspension that elastically supports the PMR writer, wherein the suspension has a flexure to which the PMR writer is joined, a load beam with one end connected to the flexure, and a base plate connected to the other end of the load beam.

12. A magnetic recording apparatus, comprising:
    (a) the HGA of claim 11;
    (b) a magnetic recording medium positioned opposite to a slider on which the PMR writer is formed;
    (c) a spindle motor that rotates and drives the magnetic recording medium; and
    (d) a device that supports the slider, and that positions the slider relative to the magnetic recording medium.

* * * * *